US006942093B2

(12) United States Patent
Timpe et al.

(10) Patent No.: US 6,942,093 B2
(45) Date of Patent: Sep. 13, 2005

(54) PROTECTIVE CASE FOR A DISC-SHAPED DATA CARRIER

(75) Inventors: Rainer Timpe, Pattensen (DE); Daniel Karim Maeder, Hannover (DE); Olaf Steiner, Hannover (DE); Kai Spandau, Hannover (DE)

(73) Assignee: Rainer TIMPE, Pattensen (DE)

( * ) Notice: Subject to any disclaimer, the term of this patent is extended or adjusted under 35 U.S.C. 154(b) by 0 days.

(21) Appl. No.: 10/677,851

(22) Filed: Oct. 3, 2003

(65) Prior Publication Data

US 2004/0206643 A1 Oct. 21, 2004

Related U.S. Application Data

(63) Continuation of application No. PCT/DE02/01245, filed on Apr. 5, 2002.

(30) Foreign Application Priority Data

Apr. 5, 2001 (DE) .......................................... 101 17 159

(51) Int. Cl.[7] .............................................. B65D 85/57
(52) U.S. Cl. .................................... 206/312; 206/308.1
(58) Field of Search ............................... 206/232, 307, 206/308.1, 309–313, 453

(56) References Cited

U.S. PATENT DOCUMENTS

| 5,385,235 A | * | 1/1995 | Ikebe et al. | .............. | 206/308.1 |
|---|---|---|---|---|---|
| 5,540,328 A | * | 7/1996 | Kohtake | .................. | 206/308.1 |
| 5,595,798 A | | 1/1997 | Miller | | |
| 5,655,656 A | * | 8/1997 | Gottlieb | .................... | 206/308.1 |
| 5,842,563 A | * | 12/1998 | Herr et al. | ............... | 206/308.1 |
| 5,913,419 A | * | 6/1999 | Doodson | ................. | 206/308.1 |
| 5,988,374 A | * | 11/1999 | Funawatari et al. | ..... | 206/308.1 |
| 6,494,319 B2 | * | 12/2002 | Collins | .................... | 206/308.1 |

FOREIGN PATENT DOCUMENTS

| DE | 42 21 127 | 1/1994 |
|---|---|---|
| DE | 197 34 060 | 2/1999 |
| DE | 198 39 244 | 3/1999 |
| DE | 198 39 242 | 3/2000 |
| FR | 2 813 140 | 2/2002 |
| WO | WO 93/24927 | 12/1993 |
| WO | WO 95/05661 | 2/1995 |
| WO | WO 96/19808 | 6/1996 |

OTHER PUBLICATIONS

International Search Report dated Oct. 9, 2002.

* cited by examiner

*Primary Examiner*—Luan K. Bui
(74) *Attorney, Agent, or Firm*—Crowell & Moring LLP

(57) ABSTRACT

A protective case for a disc-shaped data carrier (4) having a circular profile, the protective case having a bottom plate (1) and a top plate (2) that between them enclose a holding space bounded by lateral walls (3) provided for holding the data carrier (4), with the data carrier (4) being accessible via an insertion slot (6) in an end face of the protective case. Guides (5) are provided in the lateral walls (3) which support the data carrier (4) spaced a distance from the bottom plate (1). A recess or cut-out (10), which opens at the end face containing the insertion slot (6), is provided in the top plate (2) to facilitate grasping the data carrier (4). The invention provides an improved protective case of the type described above which can accommodate inserts, such as booklets, by providing interruptions (11) in the guides (5) in the lateral walls (3) adjacent the insertion slot (6) on both sides. The interruptions (11) are located in an area immediately behind the edge of the insertion slot (6) and provide access for inserting a booklet or other insert into the space (12) between the guide (5) and the bottom plate.

6 Claims, 6 Drawing Sheets

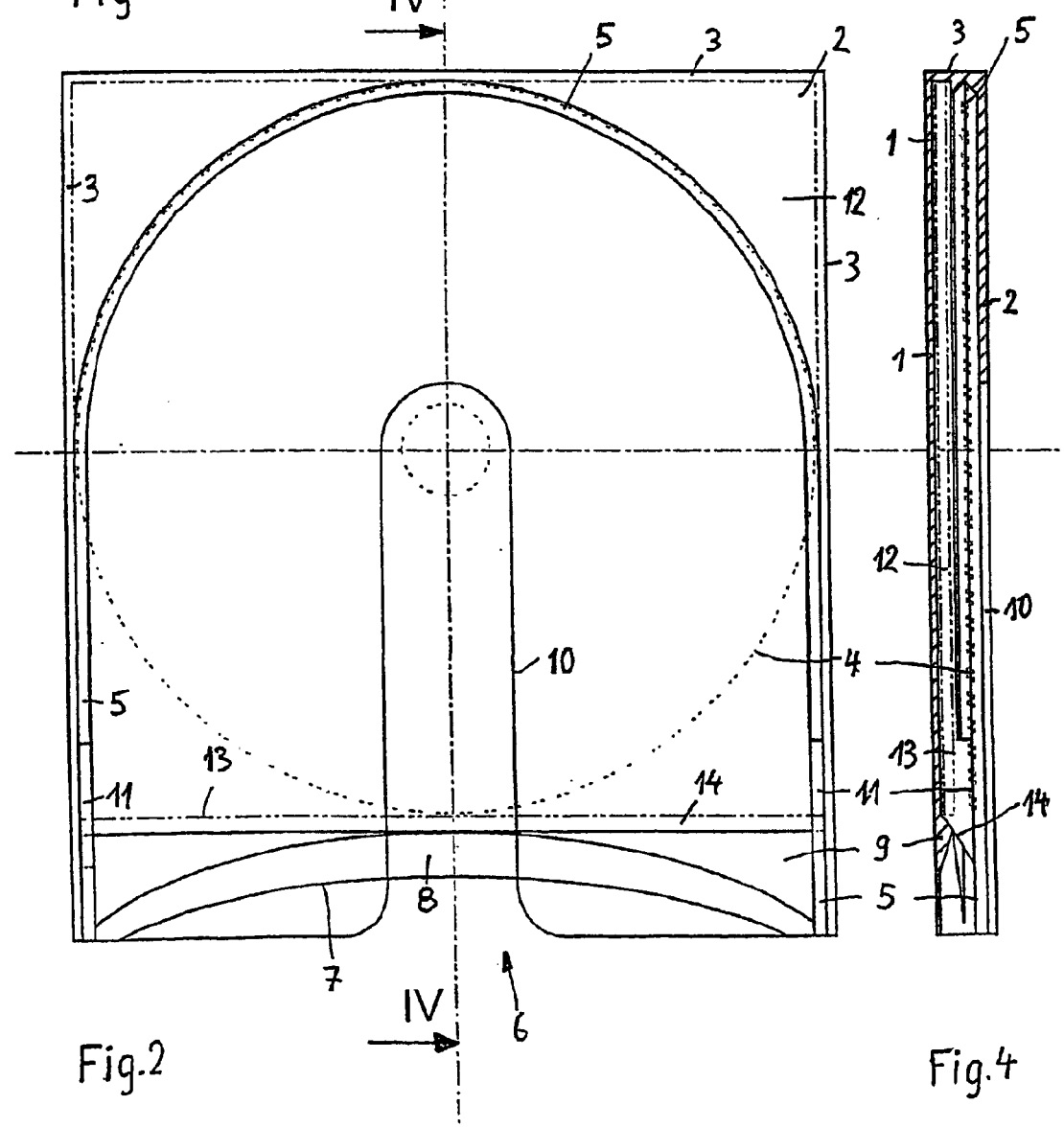

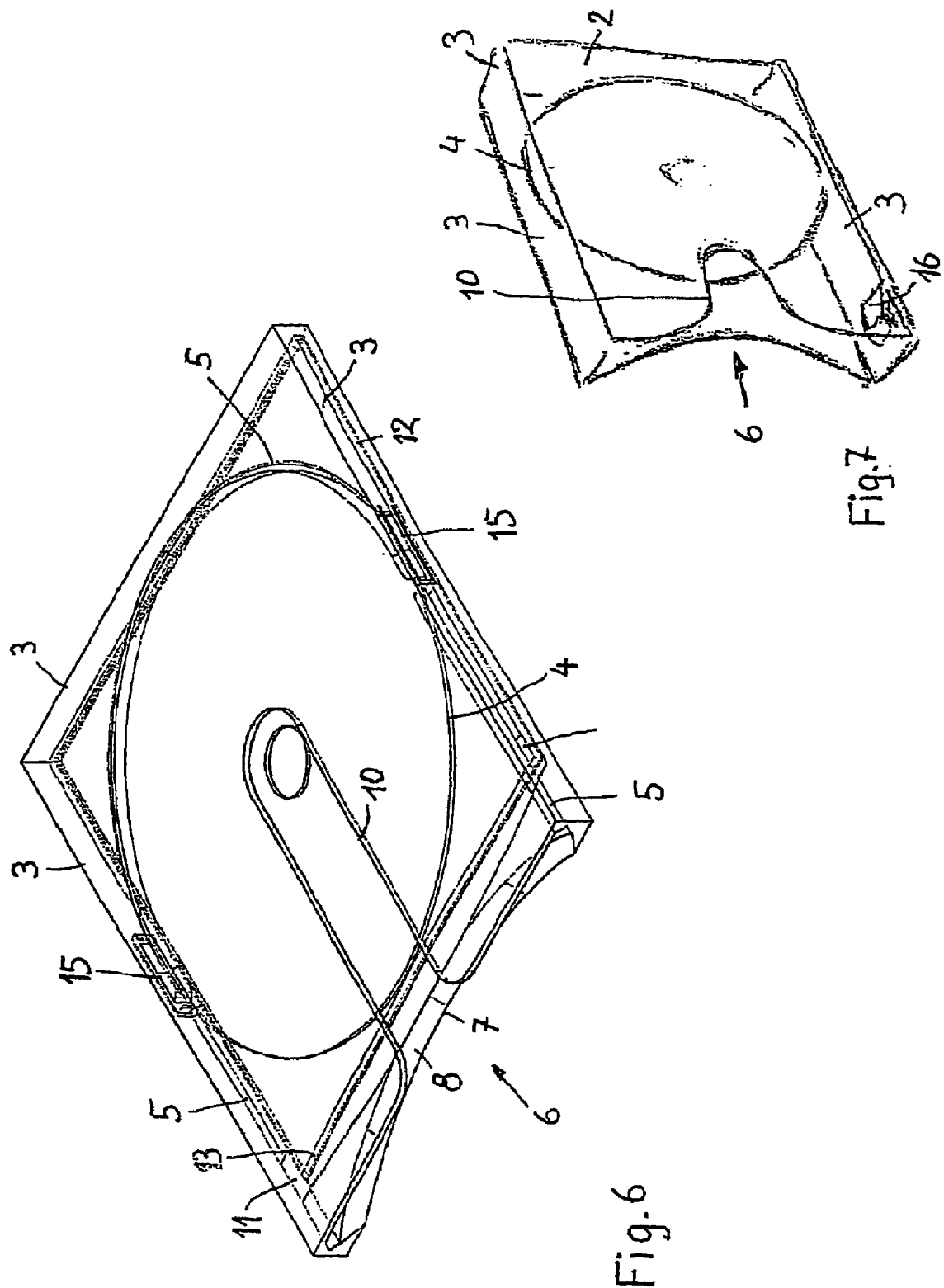

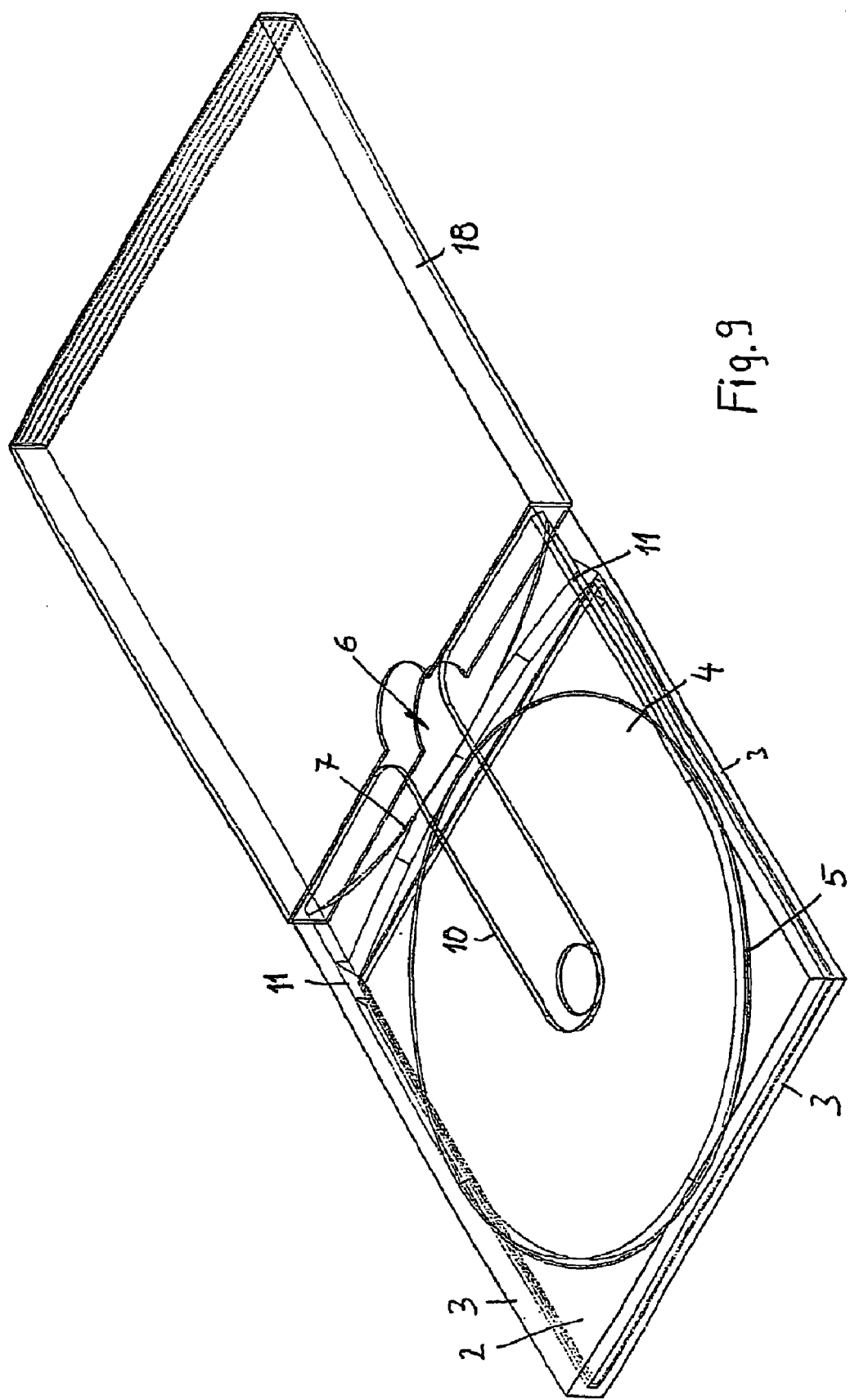

PROTECTIVE CASE FOR A DISC-SHAPED DATA CARRIER

CROSS REFERENCE TO RELATED APPLICATIONS

This application is a continuation of international patent application no. PCT/DE02/01245, filed Apr. 5, 2002, designating the United States of America, and published in German as WO 02/082443, the entire disclosure of which is incorporated herein by reference. Priority is claimed based on Federal Republic of Germany patent application no. DE 101 17 159.5, filed Apr. 5, 2001.

BACKGROUND OF THE INVENTION

The present invention relates to a protective case for a disc-shaped data carrier having a circular outline, e.g., a CD or DVD, comprising a bottom panel and a top panel which enclose between them a holding space bounded by lateral walls to accommodate the data carrier, with the data carrier being accessible through an insertion slot provided in an end face of the protective case.

A protective case of this type is known from German patent no. DE 42 21 127 and published German patent application no. DE 198 39 242. In comparison with conventional, widely used protective cases made of at least two, but usually three, parts joined together to form a hinged structure, it has the advantage that it can be manufactured much less expensively.

Another not insignificant advantage is that the peripheral edge of the data carrier is guided in the guide, which delimits the holding space on the edge. This guide ensures that the data carrier is supported spaced a distance from the base plate in the protective case. Consequently, damage to the data carrier side is prevented. With an appropriately designed guide, e.g., as a V-shaped groove, after the data carrier has been inserted into the protective case, it is not only spaced a distance from the bottom panel, but also from the top panel, so that it is not harmful to insert the data carrier even with the data carrier side facing up.

The guide may be designed so that it exerts slight clamping forces on the periphery of the data carrier. This ensures that the data carrier will be held securely in the protective case. However, such a clamping force is not necessary if other measures, e.g., a closure device as disclosed in published German patent application no. DE 198 39 244 are provided.

An important disadvantage of the known protective cases of this type is that they cannot accommodate a booklet or similar insert.

SUMMARY OF THE INVENTION

Accordingly, it is the object of the present invention to provide an improved protective case for a disc-shaped data carrier such as a CD or DVD.

Another object of the invention is to provide a protective case for a disc-shaped data carrier which can accommodate a booklet or other insert and yet can be manufactured simply and cost effectively.

A further object of the invention is to provide a protective case for a disc-shaped data carrier which can accommodate a booklet or other insert and protects the data carrying surface by holding the data carrier spaced a distance from the top and bottom panels which define the holding space.

These and other objects have been achieved in accordance with the present invention by providing a protective case for a disc-shaped data carrier having a circular profile, said case comprising a bottom panel and a top panel which enclose between them a holding space delimited by lateral walls to accommodate the data carrier, an end face of the protective case being provided with an insertion slot for inserting the data carrier into or removing the data carrier from the holding space; said lateral walls being provided with guides for the data carrier which support the data carrier spaced a distance from the bottom panel of the protective case, a cut-out which opens at the end face provided with the insertion slot provided in the top panel for gripping the data carrier, said guides having interruptions in an area just behind the edge of the insertion slot in the lateral walls which delimit the insertion slot on both sides, said interruptions providing access for insertion of an insert into a space between the guides and the base plate.

Because of the interruption in the guide in the two lateral walls delimiting the insertion slot, the possibility has been created in a very simple way to utilize the space beneath the data carrier, which is supported at a distance from the bottom panel in the protective case anyway, for insertion of a booklet or other insert. These interruptions do not interfere with the insertion, removal or storage of the data carrier in the protective case. Of course this "storage principle" may also be "doubled" by utilizing the space between the top cover panel and the data carrier as a storage space for an insert such as a booklet. This space could then also be loaded through the interruptions.

Further advantageous features and preferred embodiments of the invention are described hereinafter.

BRIEF DESCRIPTION OF THE DRAWINGS

The invention will be described in further detail hereinafter with reference to illustrative preferred embodiments shown in the accompanying drawing figures, in which:

FIG. 2 is a top view of the protective case of FIG. 1;

FIG. 3 is a front view of the protective case of FIGS. 1 and 2;

FIG. 4 is a sectional view of the protective case of the invention taken along line A—A of FIG. 2;

FIG. 6 is a perspective view of a third illustrative embodiment of the protective case of the invention;

FIG. 7 is a schematic diagram of a fourth illustrative embodiment of the protective case of the invention;

FIG. 9 is a perspective view of a sixth illustrative embodiment of the protective case of the present invention.

DETAILED DESCRIPTION OF PREFERRED EMBODIMENTS

Figure 1:
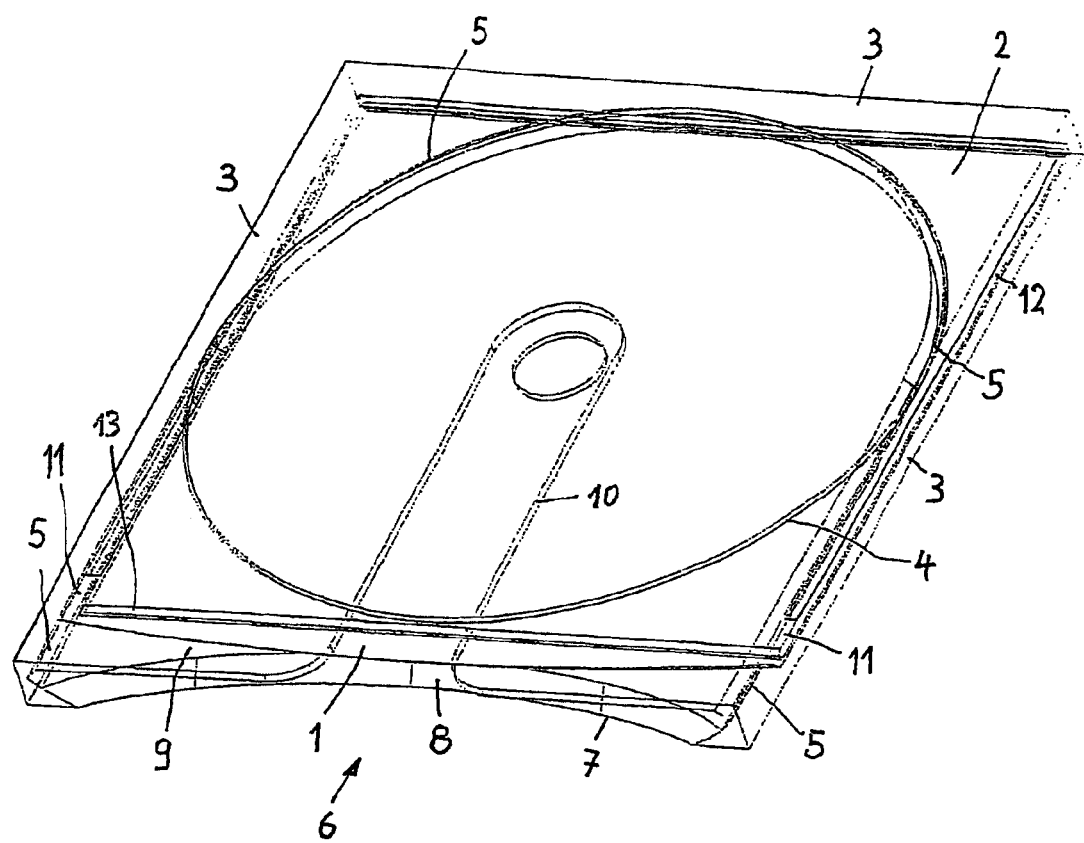
FIG. 1 is an oblique perspective view from above showing a first illustrative embodiment of the protective case of the invention.

The protective case shown in FIGS. 1 through 4 has a rectangular outline and has a bottom panel 1 and a top panel 2, which are joined together on three sides by lateral walls 3. The protective case may be manufactured in one or more pieces. It is preferably made of transparent plastic. A U-shaped holding space for a disc-shaped data carrier having a circular outline (e.g., a CD 4 is assumed below) is formed between the bottom panel 1 and the top panel 2. The holding space is delimited at the sides by a guide 5 which is in the form of a V-shaped groove. The holding space is accessible through an insertion slot 6 formed in an end face of the protective case. On this side of the insertion slot 6, the bottom panel 1 has a circular recess 7, the edge 8 of which is designed as a slope climbing toward the holding space of the CD 4. Because of this design of the edge 8, an elevation 9 (see FIG. 4) is formed on the bottom panel. On its ends adjacent to the lateral walls 3, the inclination of the edge 8 increased toward the lower edge of the guide 5, which is best shown in FIG. 4. In addition, the edge 8 has a concave shape, i.e., the elevation 9 has its greatest height at the ends of the edge 8 and then falls from both sides toward the center (FIG. 3). This design of the insertion slot 6 facilitates the insertion of a CD 4 into the protective case at the same time ensuring that the data carrier side of the CD 4, which faces downward, is not damaged because only the edge area of the CD 4 comes in contact with the protective case. The CD 4 is inserted completely into the holding space so that it is guided in the guide groove 5 along approximately half of its circumference. This insertion position is indicated with thin broken lines in FIG. 2, for example. The guides 5 are of such dimensions that a slight clamping force is exerted on the CD 4 so that it is securely held in the protective case. In this position the CD 4 does not come in contact with the top panel 2 or with the base panel 1, as can be seen best in FIG. 4. To facilitate removal of the CD 4 from the protective case, a U-shaped recess or cut-out 10 is provided in the top panel, opening toward the side of the insertion slot 6 and ending approximately in the middle area of the CD 4. This recess 10 facilitates insertion of the CD 4 into the protective case, but in particular facilitates removal of the CD from the case.

As shown in particular in FIG. 2 in combination with FIG. 4, the guide 5 has interruptions 11 which begin approximately in the area of the elevation 9. These interruptions 11 form an access for a space 12 which is provided beneath the guides 5 in the protective case, this space extending between the lateral walls 3 delimiting the insertion slot 6 and between the elevation 9 and the lateral wall 3 opposite the insertion slot 6. This space 12 serves to store a booklet 13 which is typically included with a CD 4 and which is indicated by thin dotted lines in FIGS. 2 and 4. In order to insert the booklet 13 into the space 12, the booklet 13 is first inserted into the guides 5 of the insertion slot 6 and then is pressed slightly upward at its leading end. As a result, the leading end of the booklet 13 is inserted through the interruptions 11 and the booklet can be inserted completely into the space 12. To facilitate this insertion, the elevation 9 is followed by an inclination 14 which descends toward the space 12 and extends in its edge areas up to the V-shaped grooves of the guides 5. This inclination 14 also facilitates removal of the booklet 13 from the space 12. To do so, the CD 4 must first be removed from the protective case. The booklet 13 can then be gripped with a thumb through the recess 10 in the top panel 2 and extracted from the protective case. In the case of a booklet 13 inserted into the protective case, it is secured by the elevation 9 to prevent it from accidentally slipping out.

Figure 5:
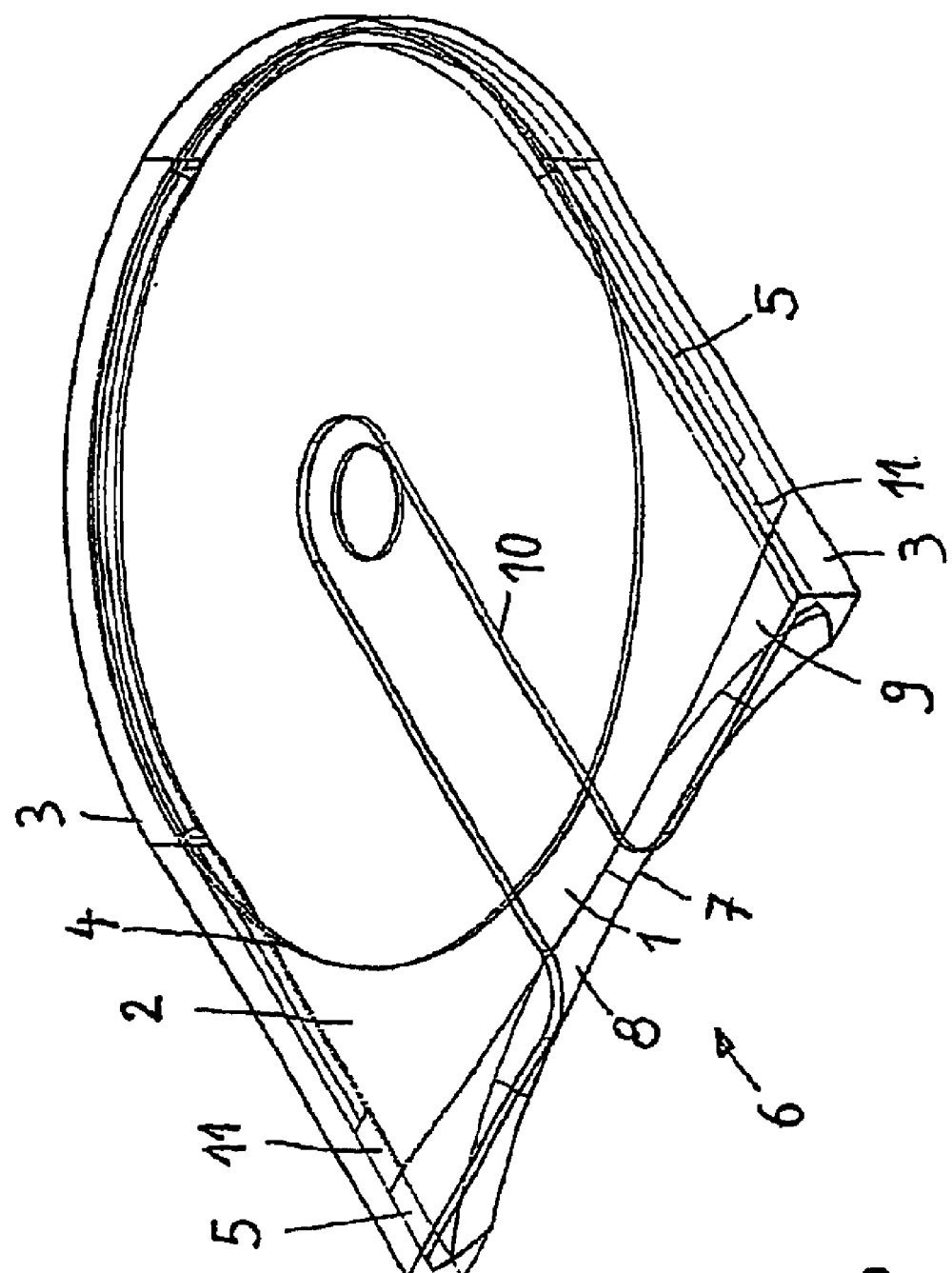
FIG. 5 is a perspective view of a second illustrative embodiment of the protective case of the invention.

The illustrative embodiment shown in FIG. 5 differs from that explained above only in that it deviates from its rectangular outline in that the protective case accommodates the curvature of the CD 4 on the end opposite the insertion slot 6. A booklet 13 inserted into the space 12 would then naturally have to accommodate the more rounded shape of the outline.

In the illustrative embodiments according to Figures through 5, the CD 4 is held in place by the clamping action in the protective case, but in the illustrative embodiment according to FIG. 6, a clamping effect is not provided due to appropriate dimensioning of the guides 5. Instead, at least one resilient tongue 15 is provided in the U-shaped grooves of the guides 5 in the lateral walls 3 adjacent the insertion slot 6. These resilient tongues yield upon insertion of the CD 4, thus permitting complete insertion of the CD 4 into the protective case and then secure the inserted CD 4 by exerting a clamping action.

In the illustrative embodiment according to FIG. 7, a clamping effect of the guides 5 is again not provided, i.e., the CD 4 can move freely forward to the rear in the guides 5 in the protective case. To prevent the CD 4 from slipping out of the protective case, a resilient tongue 16 is provided in the area of the insertion slot 6 in one of the side guides 5. In this embodiment, the CD 4 may protrude a small distance out of the protective case for its removal. Then the recess 10 in the top panel 2 may be designed to be shorter than in the preceding illustrative embodiments.

Figure 8:
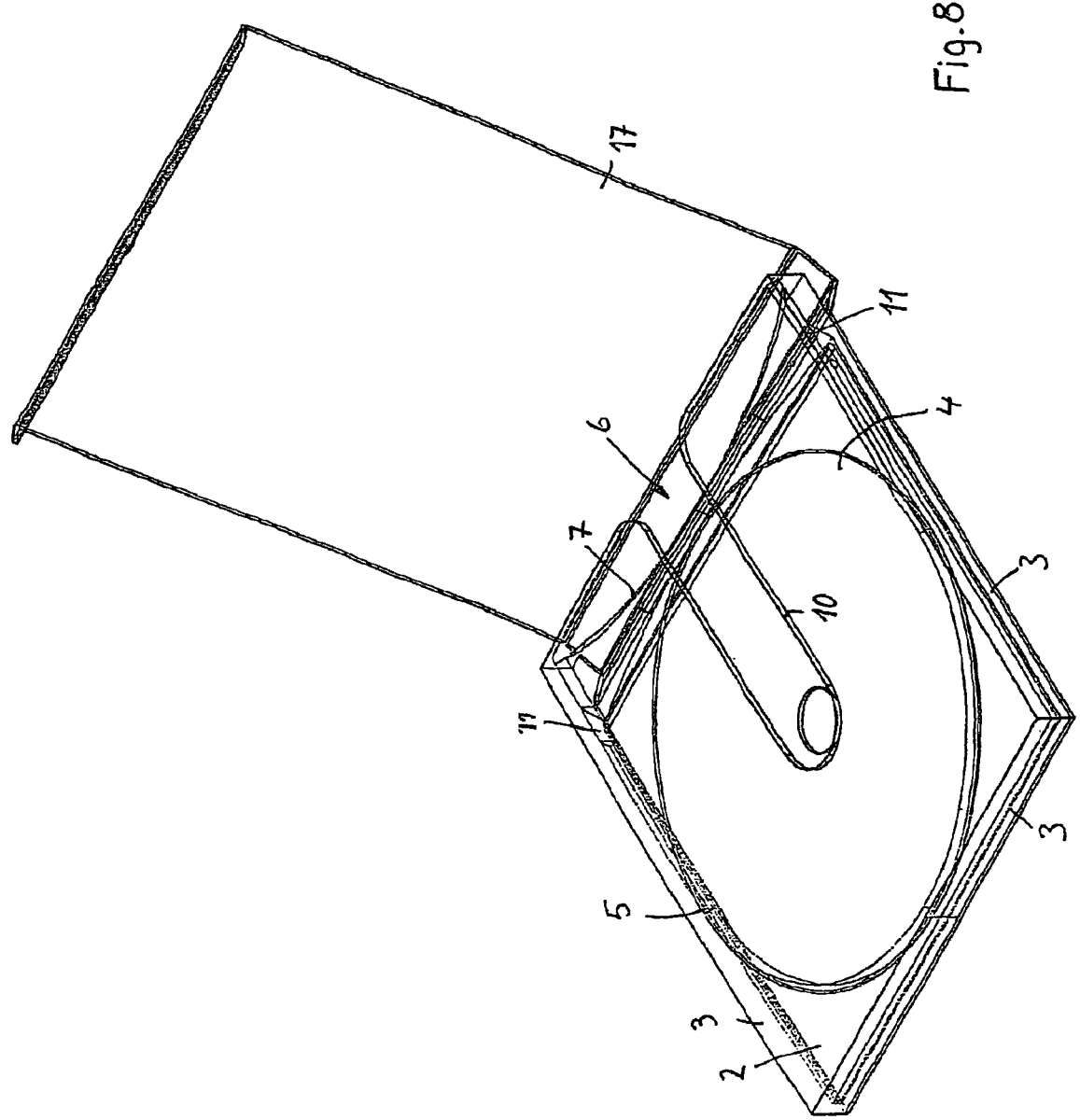
FIG. 8 is a perspective view of a fifth illustrative embodiment of the protective case of the present invention.

Additional options for preventing the CD 4 from falling out of the protective case are illustrated in FIGS. 8 and 9.

In the illustrative embodiment according to FIG. 8, a folding cover 17 is connected to the protective case. This folding cover 17 may be folded onto the protective case, so that the insertion slot 6 is covered. The folding cover 17 may be made of cardboard, so that this option does not require any breakable hinge elements. The folding cover 17 permits a high degree of individualization of the CD outer case. If needed, the folding cover 17 may also be removed from the protective case by tearing it off.

In the illustrative embodiment according to FIG. 9, a slipcase 18 is used to cover the insertion slot 6. To do so the slipcase 18 is pushed completely over the protective case. When the slipcase 18 is rotated 180°, a secured storage position becomes a freely accessible position. This can be further optimized to improve rapidity of access if the slipcase 18 has slotted and circular segment-shaped recesses 7, 10 like the protective case. Again in this case, the slipcase 18 may be made of cardboard.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A protective case for a disc-shaped data carrier having a circular profile, said case comprising a bottom panel and a top panel which enclose between them a holding space delimited by lateral walls to accommodate the data carrier, an end face of the protective case being provided with an insertion slot for inserting the data carrier into or removing the data carrier from the holding space; said lateral walls being provided with guides for the data carrier which support the data carrier spaced a distance from the bottom panel of the protective case, a cut-out which opens at the end face provided with the insertion slot provided in the top panel for gripping the data carrier, said guides having interruptions in an area just behind the edge of the insertion slot in the lateral walls which delimit the insertion slot on both sides, said interruptions providing access for insertion of an insert into a space between the guides and the bottom panel, wherein the bottom panel has a circular segment-shaped recess adjacent the insertion slot, said recess forming an inclined curved edge, and wherein the inclination of the edge on the bottom panel forms an elevation which drops in an inclination to the level of the bottom panel from the beginning of the interruptions of the guides on both sides of the case.

2. A protective case according to claim 1, wherein the guide is in the form of a V-shaped groove.

3. A protective case according to claim 1, further comprising at least one resilient tongue provided in at least one guide for exerting a clamping action on the data carrier.

4. A protective case according to claim 1, further comprising means for closure of the insertion slot.

5. A protective case according to claim 4, wherein said closure means comprise a slipcase which can be pushed onto the protective case.

6. A protective case according to claim 4, wherein said closure means comprise a folding cover affixed to the protective case.

* * * * *